United States Patent
Nylander et al.

(10) Patent No.: US 8,879,486 B2
(45) Date of Patent: Nov. 4, 2014

(54) METHOD AND ARRANGEMENTS IN A MOBILE TELECOMMUNICATIONS SYSTEM

(75) Inventors: Tomas Nylander, Värmdö (SE); Johan Rune, Lidingö (SE); Jari Vikberg, Järna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 192 days.

(21) Appl. No.: 13/377,097

(22) PCT Filed: Jun. 18, 2009

(86) PCT No.: PCT/SE2009/050761
§ 371 (c)(1),
(2), (4) Date: Dec. 8, 2011

(87) PCT Pub. No.: WO2010/147524
PCT Pub. Date: Dec. 23, 2010

(65) Prior Publication Data
US 2012/0106488 A1    May 3, 2012

(51) Int. Cl.
| | |
|---|---|
| H04W 72/04 | (2009.01) |
| H04W 8/26 | (2009.01) |
| H04L 29/12 | (2006.01) |
| H04W 88/08 | (2009.01) |
| H04W 24/02 | (2009.01) |

(52) U.S. Cl.
CPC ............ *H04L 61/1511* (2013.01); *H04W 8/26* (2013.01); *H04W 88/08* (2013.01); *H04W 24/02* (2013.01); *H04L 29/12066* (2013.01)
USPC ...................... 370/329; 370/395.2; 455/435.1

(58) Field of Classification Search
USPC ................. 370/328, 329, 395.2; 455/435
See application file for complete search history.

(56) References Cited

U.S. PATENT DOCUMENTS

| | | | | |
|---|---|---|---|---|
| 8,041,335 B2 * | 10/2011 | Khetawat et al. | ........... | 455/404.2 |
| 8,064,909 B2 * | 11/2011 | Spinelli et al. | ................ | 455/436 |

(Continued)

FOREIGN PATENT DOCUMENTS

CN          101061389 A          10/2007

OTHER PUBLICATIONS

Deguang, L. et al. "A Review of Mobility Support Paradigms for the Internet." IEEE Communications Surveys, IEEE, Jan. 1, 2006, pp. 38-51, vol. 8, No. 1, New York, NY, USA.

(Continued)

*Primary Examiner* — Edan Orgad
*Assistant Examiner* — Emmanuel Maglo
(74) *Attorney, Agent, or Firm* — Coats & Bennett, PLLC

(57) ABSTRACT

The present invention relates to methods and arrangements for introducing an automatic one-time configuration of the DNS server(s) when a base station gateway, such as an HeNB GW, is deployed, such that the FQDN-to-HeNB GW IP address translation data is proactively configured. This is performed to identify the base station gateway address to which subsequently deployed base stations will be connected. That is, the FQDN-to-HeNB GW IP address translation data for the HeNB IDs of all the HeNBs that may potentially connect to the HeNB GW is proactively configured in the DNS server(s), thereby avoiding frequent and constantly ongoing DNS configuration during normal network operation. This configuration of the DNS allows the eNB to obtain the destination address for an X2 connection without knowing about an eventual HeNB GW, nor the addressing details, such as size/length (or fixed number of bits) of the HeNB GW ID.

29 Claims, 10 Drawing Sheets

(56) References Cited

U.S. PATENT DOCUMENTS

| | | | |
|---|---|---|---|
| 8,554,933 B2* | 10/2013 | Delos Reyes et al. | 709/229 |
| 2003/0216140 A1* | 11/2003 | Chambert | 455/426.1 |
| 2007/0002859 A1 | 1/2007 | Corson et al. | |
| 2007/0060097 A1* | 3/2007 | Edge et al. | 455/404.1 |
| 2007/0097983 A1* | 5/2007 | Nylander et al. | 370/395.2 |
| 2007/0183427 A1* | 8/2007 | Nylander et al. | 370/395.2 |
| 2008/0076386 A1* | 3/2008 | Khetawat et al. | 455/410 |
| 2009/0059848 A1 | 3/2009 | Khetawat et al. | |
| 2009/0061877 A1 | 3/2009 | Gallagher et al. | |
| 2009/0129291 A1* | 5/2009 | Gupta et al. | 370/254 |
| 2009/0156213 A1* | 6/2009 | Spinelli et al. | 455/436 |
| 2009/0268635 A1* | 10/2009 | Gallagher et al. | 370/254 |
| 2009/0268722 A1* | 10/2009 | Gallagher et al. | 370/352 |
| 2009/0270097 A1* | 10/2009 | Gallagher et al. | 455/435.1 |
| 2009/0270098 A1* | 10/2009 | Gallagher et al. | 455/435.1 |
| 2010/0039991 A1* | 2/2010 | Godin et al. | 370/328 |
| 2010/0124897 A1* | 5/2010 | Edge | 455/404.1 |
| 2010/0215019 A1* | 8/2010 | Velev et al. | 370/331 |
| 2010/0296453 A1* | 11/2010 | Grahn et al. | 370/328 |
| 2011/0004747 A1* | 1/2011 | Venkatachalam | 713/2 |
| 2011/0235546 A1* | 9/2011 | Horn et al. | 370/254 |
| 2012/0044949 A1* | 2/2012 | Velev et al. | 370/401 |
| 2012/0071168 A1* | 3/2012 | Tomici et al. | 455/445 |
| 2012/0084449 A1* | 4/2012 | Delos Reyes et al. | 709/229 |

OTHER PUBLICATIONS

3rd Generation Partnership Project. "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)." 3GPP TS 36.300 V8.6.0; Sep. 2008; pp. 1-137; Sophia Antipolis, Valbonne, France.

* cited by examiner

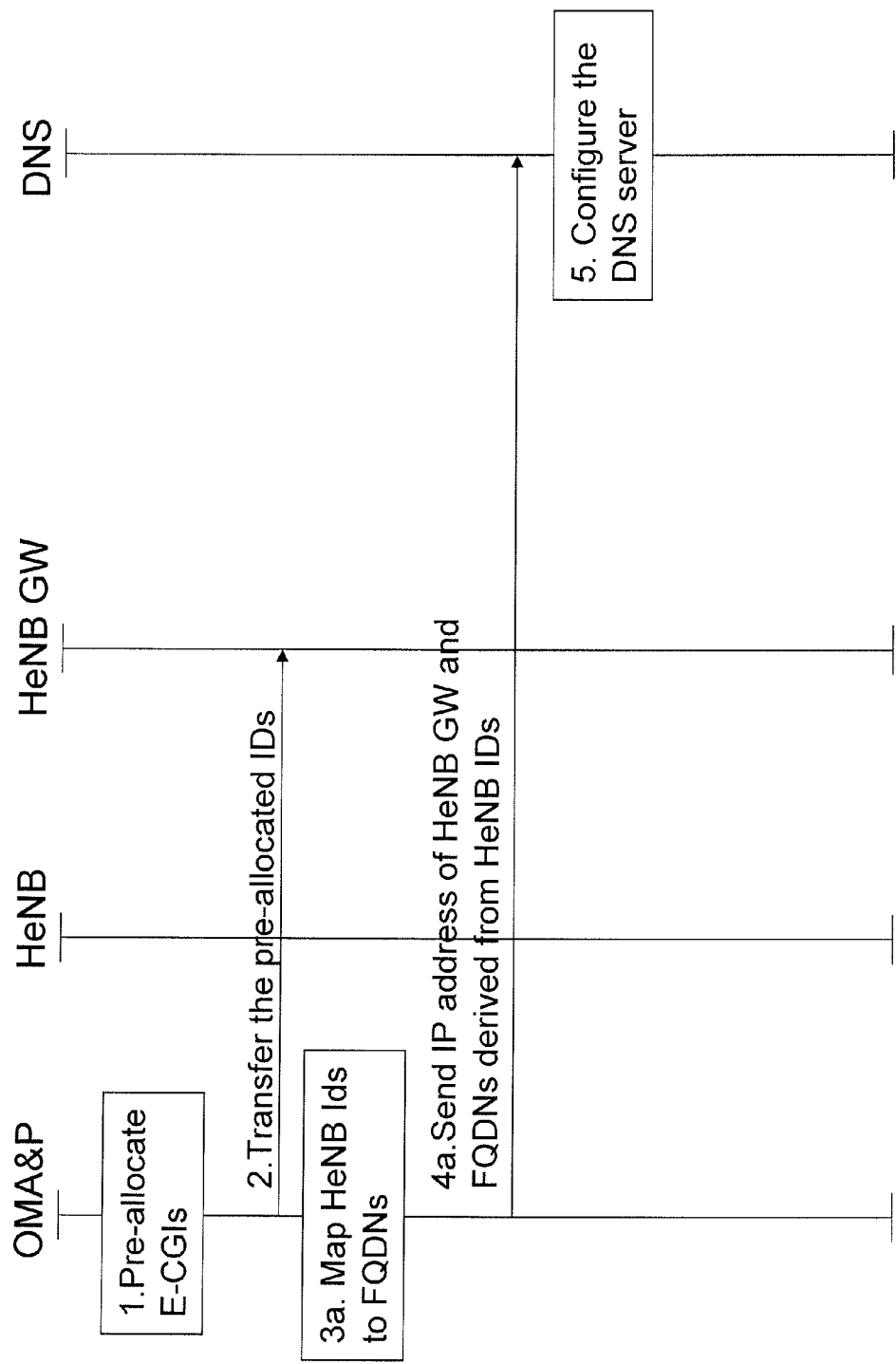

METHOD AND ARRANGEMENTS IN A MOBILE TELECOMMUNICATIONS SYSTEM

BACKGROUND

In third generation (3G) Universal Mobile Telecommunications Systems (UMTS) and in particular in its evolved version System Architecture Evolution/Long Term Evolution (SAE/LTE), also referred to as Evolved Packet System (EPS), the concept of home base stations is introduced. In 3G, a home base station is referred to as a Home Node B (HNB) whereas in EPS it is referred to as a Home eNodeB (HeNB). A cell served by a HNB or a HeNB is commonly referred to as a femtocell. A home base station is assumed to be placed in a private home, utilizing the home owner's fixed broadband connection to access the core network. It is also assumed that the home owner handles the actual physical installation of the home base station. Hence, the deployment of home base stations cannot be planned, since it is largely outside the control of the operator. Another important property of the home base station concept is the potentially very large number of home base stations.

In the further description a 3G Home Node B is abbreviated HNB, an EPS/LTE Home eNodeB is abbreviated HeNB and the abbreviation HN is used to denote either a 3G Home Node B or an EPS/LTE Home eNodeB.

A HN connects to the operator's network via a secure tunnel (supposedly IPsec protected) to a security gateway at the border of the operator's network. Via this tunnel the HN connects to the core network nodes of the operator's core network. The 3GPP operator may also deploy a concentrator node in its core network between the HNs and the regular core network nodes. In the EPS standardization such a concentrator node is commonly referred to as a HeNB Gateway, which may be an optional node in EPS HeNB solutions. The corresponding node name in 3G UMTS standardization is HNB Gateway and this node is mandatory in 3G HNB systems. In this specification both HNB Gateways and HeNB Gateways may also be referred to as HN Gateways.

For both EPS and 3G UMTS the HN uses a broadband access network as part of the transport network. Through this setup a UE communicates via the HN and the core network like any other UE.

The HN concept is closely related to the concept of Closed Subscriber Group (CSG). A femtocell is also assumed to be a CSG cell. This means that only a selected group of subscribers are allowed to access the network through that cell. The CSG of a CSG cell is identified by a CSG ID, which is broadcast in the cell as a part of the system information. Typically each CSG cell has its own unique CSG ID but it is also possible to define the same CSG ID for multiple cells, thereby forming a CSG zone, in which the same selected group of subscribers is allowed access. Although a CSG cell in principle does not have to be a femtocell, the two terms are often used as synonyms.

Hence, all subscribers are not allowed to access a certain HN and a certain subscriber is not allowed to access all HNs. Under supervision of the operator the owner of a HN defines which subscribers are allowed to access a femtocell (CSG cell) of the HN (i.e. which subscribers that are included in the CSG of the femtocell). This is assumedly done through a web interface (or other "interface" between the HN owner and the operator), and the CSG data (or HN access list (which is an equivalent term assuming that the HN only serves one CSG)) is stored in a database in the operator's network. The HN owner would assumedly enter the allowed subscribers in the form of Integrated Services Digital Network (ISDN) numbers (Mobile Subscriber ISDN Numbers MSISDNs) or International Mobile Subscriber Identities (IMSIs) of the concerned subscribers.

FIG. 1 shows a mobile communication network with home base stations providing femto cells 110. The network comprises a core network (CN) 100. Base stations 102 providing macro cells 108 are connected to the core network via the S1 interface. The home base stations 106 are connected to the network via the home base station gateway 104 via the S1 interface. The X2 interface is a direct interface between base stations 102. Current standards do not specify that the HeNB GW 104 nor HeNBs 106 use the X2 interface, however potentially X2 may be used there as well.

One reason for having a base station gateway, exemplified by the HeNB GW between the home base stations exemplified by the HeNBs and the CN is to cope with the assumed number of HeNBs in a network which is very high (millions of HeNBs is one estimate).

This creates a possible scaling problem on the CN side as each HeNB will have its own S1 interface and it is assumed that the MMEs are not capable of handling millions of S1 interfaces.

The HeNB GW is needed to solve these scaling and signaling load issues basically to protect and offload the CN (MMEs).

The X2 interface between eNBs is mainly used for handover, so called 'X2 initiated/based handover'. When X2 is set up between two eNBs, the identity of the eNB (eNB ID) and a list of information on the cells served by this eNB is sent to the other eNB and vice versa. Note that X2 is established only between eNBs that serve neighboring cells where handover may be performed or when Inter Cell Interference Coordination (ICIC) is needed. The X2 control plane messages (X2 Application Protocol, X2AP, messages) X2 SETUP REQUEST and X2 SETUP RESPONSE, are defined to establish an X2 interface.

The CN node that controls eNBs and HeNBs via the HeNB GWs is called Mobility Management Entity (MME). MMEs can be pooled in the sense that a group, or pool, of MMEs share the task of controlling a certain set of (H)eNBs, wherein the cells served by these (H)eNBs preferably cover a continuous area. There is a many-to-many relation between eNBs and MMEs, such that all MMEs in an MME pool are connected to all the eNBs that the MME pool controls. For HeNBs the many-to-many relation with the MMEs is preferably mediated, or proxied, by a HeNB GW.

The MMEs also handle control signaling towards the UEs that are connected via the (H)eNBs, using the Non-Access Stratum (NAS) protocols. For each UE that accesses the network via an eNB, the eNB selects an MME in the MME pool, which will handle the NAS signaling towards the UE for as long as the UE remains connected to the MME pool (i.e. as long as the UE remains connected to the CN via one of the (H)eNBs belonging to the MME pool). Since the eNBs mostly select different MMEs for different UEs, load-sharing is effectively introduced between the MMEs of an MME pool. When HeNBs are connected to the CN without an intermediate HeNB GW, the HeNBs act in the same manner as eNBs in this respect, i.e. they have S1 interfaces towards each MME in the MME pool and selects MME on a per UE basis. However, in the case where a HeNB GW is deployed, it is assumed that the MME pool support (e.g. selection of an MME) is performed by the HeNB GW on behalf of its connected HeNBs. That is, each HeNB only has a single S1 interface towards the HeNB GW, whereas the HeNB GW has an S1 interface to each of the MMEs in the MME pool. The HeNB GW must thus handle selection of MME per UE based on any information it receives in S1AP messages from the HeNBs. To keep the same MME for a certain UE the HeNB provides the available information received from the UE to the HeNB GW so that it can preferably again select the same MME as previously i.e. when still connected to the same MME pool.

An EPS network of more than moderate size will typically have several MME pools, where each MME pool controls a subset of the network's (H)eNBs. The X2 interface is only established between (H)eNBs belonging to the same MME pool. Between (H)eNBs belonging to different MME pools the handover signaling is conveyed via MMEs and the S1 and S10 interfaces where the S10 interface is the inter-MME pool (control plane) interface, i.e. an interface for control signaling between two MMEs belonging to different MME pools.

Within a PLMN each MME pool is uniquely identified by an MME Group Identity (MMEGI).

Identities and other configuration data in MMEs, eNBs and other nodes in a network are typically configured from a Operation, Maintenance, Administration and Provisioning (OAM&P) system. In this context it is often enough to refer to the O&M system, which can be seen as a subset of the OAM&P system. In the context of this document the terms OAM&P and O&M are used more or less as interchangeable equivalents.

When an eNB receives a measurement report from a UE which indicates that a cell belonging to another eNB may be a suitable handover target, the eNB may decide to establish an X2 interface towards the eNB serving the reported cell. The eNB will then request the UE to report the E-CGI (and some other parameters) of the reported cell (unless the UE has already done so). From the E-CGI of the reported cell the eNB then extracts the eNB ID of the eNB serving the reported cell (i.e. the eNB ID of the target eNB). The eNB then constructs an FQDN (Fully Qualified Domain Name) based on the eNB ID of the target eNB and includes this FQDN in a DNS query which it sends to a DNS server. The DNS server returns an IP address (or possibly a list of IP addresses) belonging to the target eNB and which can be used for X2 establishment. The eNB then initiates the X2 establishment by establishing a Stream Control Transmission Protocol (SCTP) connection and sending an X2 SETUP REQUEST message to the retrieved IP address (or one of the retrieved IP addresses in case the DNS server returned more than one IP address). The target eNB responds with an X2 SETUP RESPONSE message. A basic function of a DNS server is to perform the above described FQDN-to-IP address translation. A more general description of basic DNS server functionality is that it performs FQDN-to-Resource Record (RR) translation/resolution. There are several types of resource records. One of them, denoted "A record", includes an IPv4 address, while another one, denoted "AAAA record", includes an IPv6 address. Other types of resource records may include FQDNs, such as the "CNAME record" type or the "SRV record" type. Hence, in the description of the X2 establishment procedure above the DNS server returned an A record or an AAAA record (or a list of A or AAAA records (or even a combination of A and AAAA records) in case the DNS server returned multiple IP addresses). Note that resolution of an FQDN into an IP address via the DNS may involve a single or multiple DNS servers. In the latter case the multiple DNS servers are contacted recursively or iteratively (or a mix thereof). However, in order not to obscure the essentials of the invention the descriptions in this document are written as if a DNS query were always resolved by a single DNS server.

A mobile network may have several hundreds of thousands or millions of HeNBs. A capacity of the control nodes in the CN (Mobility Management Entities, MMEs) that will be able to handle that many HeNBs, i.e. that many control parts of S1 interfaces (S1-MMEs), is not reasonable. Therefore, one purpose of the HeNB GW, as illustrated in FIG. 1, is to conceal the large number of HeNBs from the CN. The HeNB GW will, from the CN (over the S1 interface), look like one eNB with many cells. The HeNB GW will act as an eNB proxy for all the HeNBs that are connected to the HeNB GW. From a HeNB, the HeNB GW will look like the CN (a regular S1 interface or possibly a slightly modified version thereof).

SUMMARY

Thus the main problem related to the X2 interface establishment in conjunction with femtocells is the potentially great number of femtocells and the consequent great number of neighbor relations and X2 interfaces a macrocell and its eNB could need to have towards femtocells and their HeNBs.

Placing a HeNB GW in the X2 signaling path and simplifying the X2 signaling e.g. in terms of the reported served cells as described above mitigates the scaling and signaling load problem, but also causes an addressing problem, which is further explained below.

This addressing problem is overcome by the present invention.

The basic concept of the invention is to introduce an automatic one-time pre-configuration of the DNS server(s) when a HeNB GW is deployed, such that all the FQDN-to-HeNB GW IP address translation data is proactively configured. That is, the FQDN-to-HeNB GW IP address translation data for the HeNB IDs of all the HeNBs that may potentially connect to the HeNB GW is proactively configured in the DNS server(s), thereby avoiding frequent and constantly ongoing DNS configuration during normal network operation.

This configuration of the DNS allows the eNB to obtain the destination address for an X2 connection without knowing about an eventual HeNB GW, nor the addressing details, such as size/length (or fixed number of bits) of the HeNB GW ID.

Furthermore, to reduce the size of the FQDN-to-IP address translation tables in the DNS server(s) the concept of aggregated FQDN representation, or aggregated FQDN-to-IP address translation data configuration is introduced according to an embodiment of the present invention.

According to a first aspect a method for facilitating establishment of an interface between a first base station and a base station gateway in a mobile telecommunication network is provided. Subsequently deployed second base stations will have a connection to the core network and to the first base stations of the mobile telecommunication network via the base station gateway. In the method, base station identities for the subsequently deployed second base stations to be connected to the base station gateway are pre-allocated. The base station identities are mapped to at least one FQDN, and said at least one FQDN together with at least one IP address of the base station gateway to a DNS server are sent, and the DNS server is configured with said at least one FQDN and the at least one IP address such that an FQDN of a base station of the subsequently deployed second base stations can be mapped to an identity of the base station gateway which the base station will be connected to.

The pre-allocated base station identities may be mapped to one plain FQDN or to an aggregated FQDN.

According to a second aspect of the present invention a method in a network node for facilitating establishment of an interface between a first base station and a base station gateway in a mobile telecommunication network is provided.

Subsequently deployed second base stations will have a connection to the core network and to the first base stations of the mobile telecommunication network via the base station gateway. The method comprises the step of pre-allocating base station identities for the subsequently deployed second base stations to be connected to the base station gateway, wherein the base station identities are configured to be subsequently mapped to at least one FQDN for DNS lookup at a DNS server such that base station gateways can be identified to which subsequent deployed second base stations will be connected to.

According to a third aspect of the present invention, a method in a base station gateway for facilitating establishment of an interface between a first base station and the base station gateway in a mobile telecommunication network is provided. Subsequently deployed second base stations will have a connection to the core network and to the first base stations of the mobile telecommunication network via the base station gateway. The method comprises the step of receiving pre-allocated base station identities for subsequently deployed second base stations to be connected to the base station gateway. The base station identities are configured to be subsequently mapped to at least one FQDN for DNS look up at a DNS server such that base station gateways can be identified to which subsequent deployed second base stations will be connected to.

According to a fourth aspect of the present invention, a method in a DNS server for facilitating establishment of an interface between a first base station and a base station gateway in a mobile telecommunication network is provided. Subsequently deployed second base stations will have a connection to the core network and to the first base stations of the mobile telecommunication network via the base station gateway. In the method at least one FQDN, associated with pre-allocated base station identities for the subsequently deployed second base stations to be connected to the base station gateway, is received together with at least one IP address of the base station gateway to which the subsequently deployed second base stations will be connected, and the DNS server is configured with said at least one FQDN together with at least one IP address of the base station gateway such that an FQDN of a subsequently deployed second base station can be mapped to an identity of the base station gateway which the second base station will be connected to.

According to a fifth aspect of the present invention, a network node for facilitating establishment of an interface between a first base station and a base station gateway in a mobile telecommunication network is provided. Subsequently deployed second base stations will have a connection to the core network and to the first base stations of the mobile telecommunication network via the base station gateway. The network node comprises an allocator for pre-allocating base station identities for the subsequently deployed second base stations to be connected to the base station gateway. The base station identities are configured to be subsequently mapped to at least one FQDN for DNS lookup at a DNS server such that base station gateways can be identified to which subsequent deployed second base stations will be connected to.

According to a sixth aspect of the present invention a base station gateway for facilitating establishment of an interface between a first base station and the base station gateway in a mobile telecommunication network is provided. Subsequently deployed second base stations will have a connection to the core network and to the first base stations of the mobile telecommunication network via the base station gateway. The base station gateway comprises a receiver for receiving pre-allocated base station identities for subsequently deployed second base stations to be connected to the base station gateway, wherein the base station identities are configured to be subsequently mapped to at least one FQDN for DNS look up at a DNS server such that base station gateway can be identified to which subsequent deployed second base stations will be connected to.

According to seventh aspect of the present invention, a DNS server for facilitating establishment of an interface between a first base station and a base station gateway in a mobile telecommunication network is provided. Subsequently deployed second base stations will have a connection to the core network and to the first base stations of the mobile telecommunication network via the base station gateway. The DNS server comprises a receiver for receiving at least one FQDN, associated with pre-allocated base station identities for the subsequently deployed second base stations to be connected to the base station gateway, together with at least one IP address of the base station gateway to which the subsequently deployed second base stations will be connected. It further comprises a processor for configuring the DNS server with said at least one FQDN together with at least one IP address of the base station gateway such that an FQDN of a subsequently deployed second base station can be mapped to an identity of the base station gateway which the second base station will be connected to.

An advantage of embodiments of the present invention is that they make it possible to deploy HeNB GWs with different capacity in the same network, e.g. for gradual upgrades as the HeNB/femtocell market grows thanks to dynamic derivation of the identities and addresses of any HeNB GW in a network, irrespective of its capacity and size of HeNB GW ID, from the E-CGI of one of the femtocells served by the HeNB GW and to achieve this without more than an initial (one-time) configuration effort.

A further advantage of embodiments of the present invention is that they enable proactive DNS server configuration, so that eNBs can use the regular DNS mechanism (as used for regular X2 establishment between eNBs) for resolving a HeNB ID into a HeNB GW IP address, while still avoiding extensive DNS configuration and re-configuration efforts during regular network operation. Furthermore the aggregated FQDN representation or aggregated FQDN-to-IP address translation data configuration concept allows huge numbers of HeNB IDs to be configured in the DNS server(s) without creating huge translation tables in the DNS server(s).

BRIEF DESCRIPTION OF THE DRAWINGS

FIGS. 3*a-b* and 4*a-b* illustrate embodiments of the present invention.

DETAILED DESCRIPTION

Figure 1:
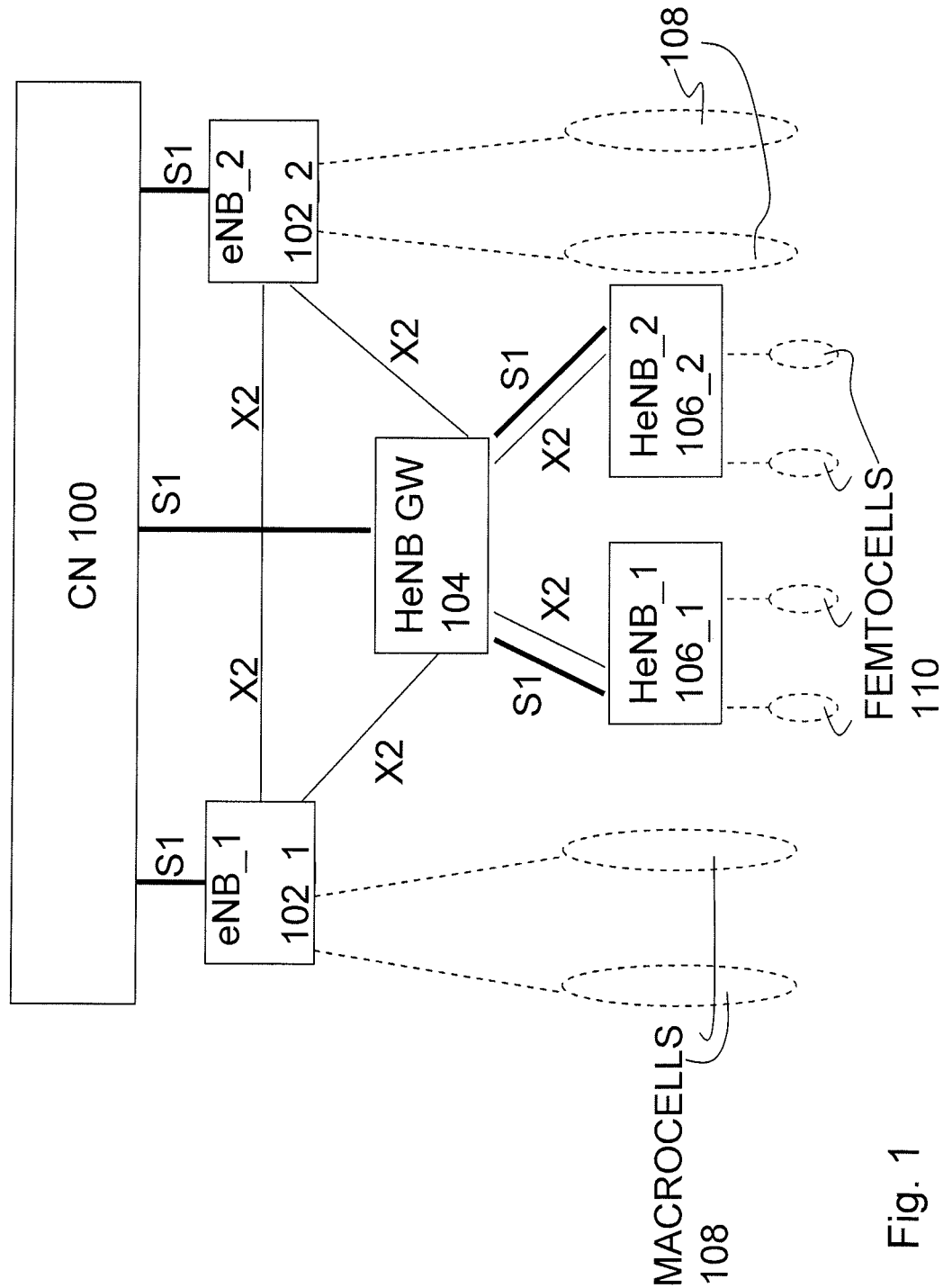
FIG. 1 schematically illustrates a mobile telecommunication network wherein the present invention may be implemented.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

As stated above, the main problem related to the X2 interface establishment in conjunction with femtocells is the potentially great number of femtocells and the consequent great number of neighbor relations and X2 interfaces a macrocell and its eNB could need to have towards femtocells and their HeNBs.

Placing a HeNB GW in the X2 signaling path and simplifying the X2 signaling e.g. in terms of the reported served cells as described above mitigates the scaling and signaling load problem, but also causes an addressing problem which is further explained below.

Regarding the control part of the X2 interface (X2-CP), i.e. the X2 interface between an eNB and a HeNB (or between two HeNBs) would pass via a HeNB GW (or via two HeNB GWs in case the X2 interface is established between two HeNBs connected to different HeNB GWs). Similar to what is the case for the S1 interface, the HeNB GW will act as an eNB proxy for the HeNB on the X2 interface. On the X2 interface the HeNB GW should look like one (H)eNB with many cells from another eNB and as an eNB with many cells from the HeNB.

The number of HeNBs connected to a HeNB GW is likely to be up to several tens of thousands (~100 000) so the number of HeNB GWs in a full network (~1 million HeNBs) will probably not exceed a few tens (~10). Thus the number of femtocells "served" by an HeNB GW (an eNB proxy) may be up to a few hundreds of thousands (~200 000), assuming a HeNB on average serves a few (~2) femtocells. Each eNB and HeNB will have an identity, i.e. an eNB ID and a HeNB ID respectively. The eNB ID/HeNB ID is used to address a particular eNB/HeNB. Note that in this document the HeNB ID is also referred to as the eNB ID of the HeNB.

One eNB cannot keep addressing information and X2 interfaces to the potentially great number of HeNBs whose femtocells may be neighbors to (e.g. covered by) the macrocell(s) served by the eNB. It is assumed that the X2 interface to a HeNB is established via the HeNB GW meaning that the HeNB GW will act as an X2 proxy in both directions. This means also that the HeNB GW will solve the scaling, signaling load and security towards the eNBs in a similar way as it protects the CN.

Referring to FIG. 1, when the need arises to perform a handover between eNB_1 102_1 and HeNB_1 106_1, an X2 interface between eNB_1 102_1 and HeNB_1 106_1 is needed (at least preferred since X2 handover is more efficient than S1 handover). This means that an X2 interface needs to be established first between the eNB_1 102_1 and the HeNB GW 104 and then between the HeNB GW 104 and the HeNB_1 106_1. If the X2 interface is established as normally, then the HeNB GW 104 informs the eNB_1 102_1 about all the femtocells that are handled by the HeNBs connected to this HeNB GW 104. In the same way, the eNB_1 102_1 informs the HeNB GW 104 about all the macrocells that it is serving. The same principles could be used between the HeNB GW and the HeNB(s).

The addressing information used to establish an X2 interface assuming now that the handover is from eNB_1 to HeNB_1 is based on that the UE will report a unique cell identity of the target cell (a so-called E-CGI, E-UTRAN Cell Global Identity or Enhanced Cell Global Identity) obtained from the system information broadcasted by HeNB_1. The total length of the E-CGI is defined to be 28 bits and part of it (or all of it for a HeNB serving only one cell) will contain the (H)eNB ID (i.e. the node identifier).

However, the situation is somewhat different in the case the HeNB GW is used as an X2 proxy. In this case, it should be possible to identify and address the HeNB GW that is controlling the HeNB based on the E-CGI (or preferably the HeNB ID) received from the HeNB, since the HeNB GW is the node towards which the X2 interface should be established. Accordingly, the embodiments of the present invention makes it possible to identify and address the HeNB GW that is controlling the HeNB based on the E-CGI or the HeNB ID received from the HeNB.

It should be noted that the embodiments of the present invention are described in the context of an LTE network and wherein the base station gateway is a home base station gateway connecting home base stations. It should however be understood that the embodiments of the invention are not limited to LTE or home base stations.

Figure 2:
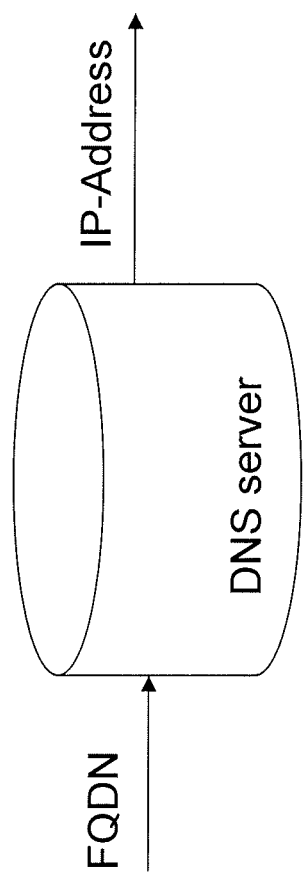
FIG. 2 shows a DNS server.

As stated above, when an X2 interface should be established between a first base station, e.g. a macro base station, and a second base station, e.g. a home base station, via a base station gateway, e.g. a home base station gateway, to which the second base station is connected, it is desired to at the first base station determine the IP address of the base station gateway. I.e. the macro base station should be able to look up the IP address of the base station gateway based on the FQDN of the particular base station in its DNS server as illustrated in FIG. 2.

The idea of the present invention is to introduce an automatic one-time configuration of the DNS server(s) when a base station gateway, such as an HeNB GW, is deployed, such that the FQDN-to-HeNB GW IP address translation data is proactively configured. That is, the FQDN-to-HeNB GW IP address translation data for the HeNB IDs of all the HeNBs that may potentially connect to the HeNB GW is proactively configured in the DNS server(s), thereby avoiding frequent and constantly ongoing DNS configuration during normal network operation. This configuration of the DNS server(s) allows the eNBs to derive the HeNB GW IP address and establish the X2 interface to any detected neighbor HeNB without knowing the HeNB GW ID and without knowing the size/length (or fixed number of bits) of the HeNB GW ID.

Turning now to FIGS. 3a-b and 4a-b, schematically illustrating a method according to embodiments of the present invention. The method facilitates establishment of an interface between a first base station 304, e.g. a macro base station, and a base station gateway, e.g. a home base station gateway, in a mobile telecommunication network. Subsequently deployed second base stations 302 will have a connection to the core network and to the first base stations 304 of the mobile telecommunication network via the base station gateway 306.

The configuration of the DNS server may be performed by either the OMA&P system or the base station gateway.

Figure 3A:
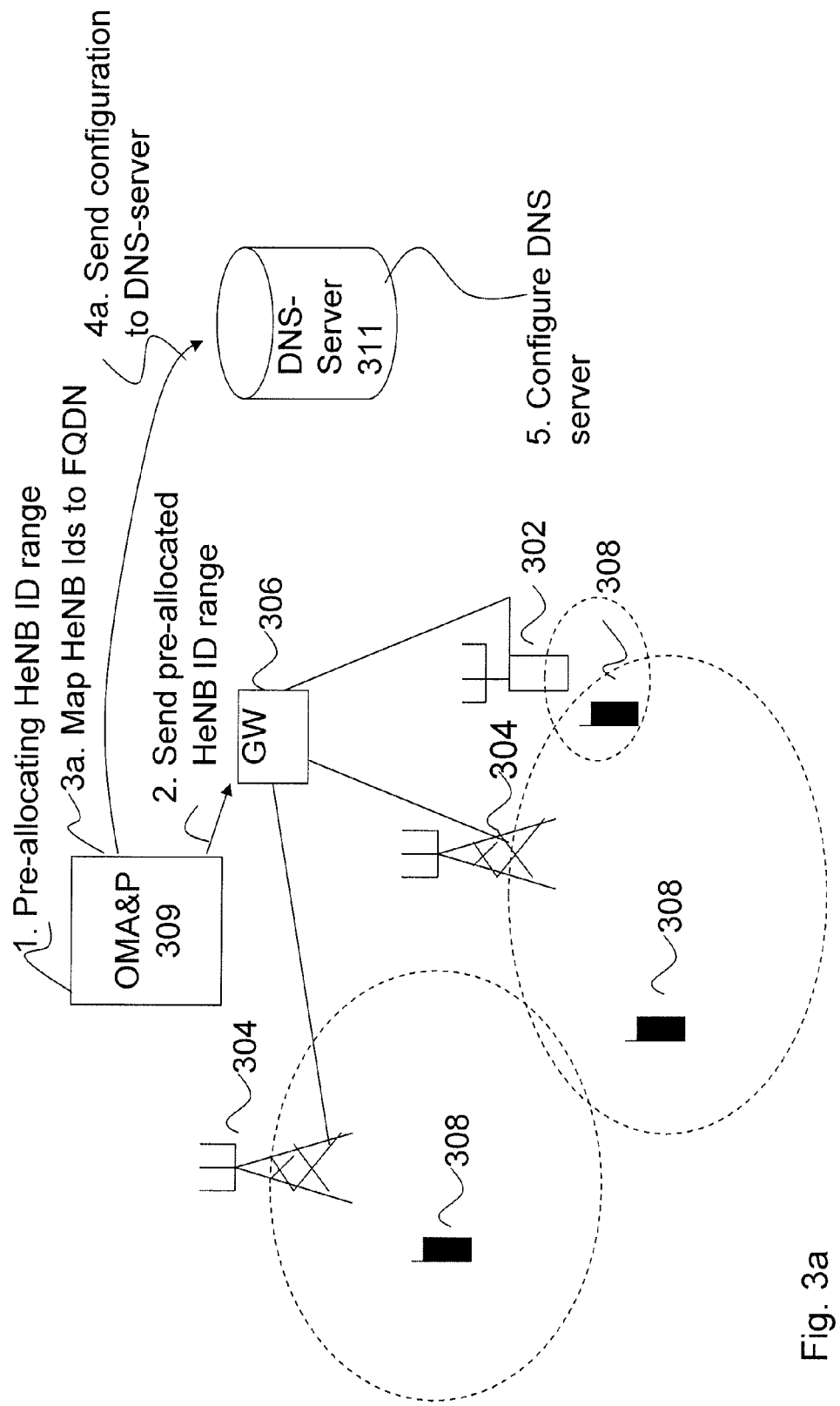

When the configuration of the DNS server is performed by the OMA&P system as illustrated by FIGS. 3a and 4a, the method comprises the steps of:

1. Pre-allocating base station identities for the subsequently deployed second base stations to be connected to the base station gateway and optionally allocating a base station gateway identity at the Operation, Maintenance, Administration and Provisioning (OMA&P) node 309.

2. The OMA&P node 309 may inform the base station gateway 306 about said allocated base station gateway identity and/or said pre-allocated base station identities.

3. The OMA&P node maps the base station identities to at least one FQDN or compact representation of range of FQDNs and 4. sends said at least one FQDN or compact representation of range of FQDNs together with at least one IP address of the base station gateway to a DNS server 311.

5. The DNS server 311 is configured with said at least one FQDN or compact representation of range of FQDNs and the at least one IP address such that an FQDN of a base station 302 of the subsequently deployed second base stations can be mapped (i.e. resolved) to an identity of the base station gateway 306 which the base station 302 will be connected to.

Figure 3B:
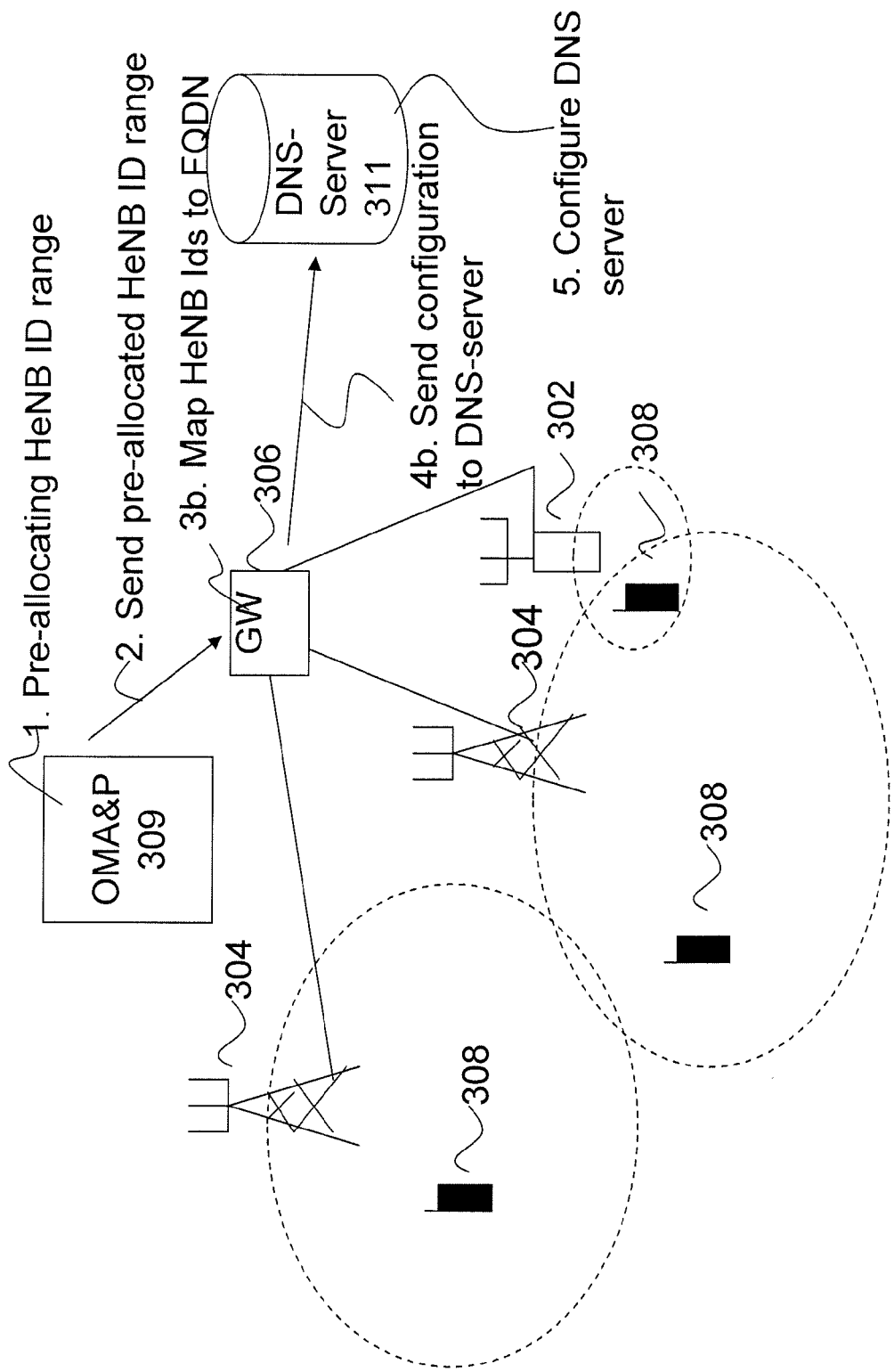
Figure 4B:
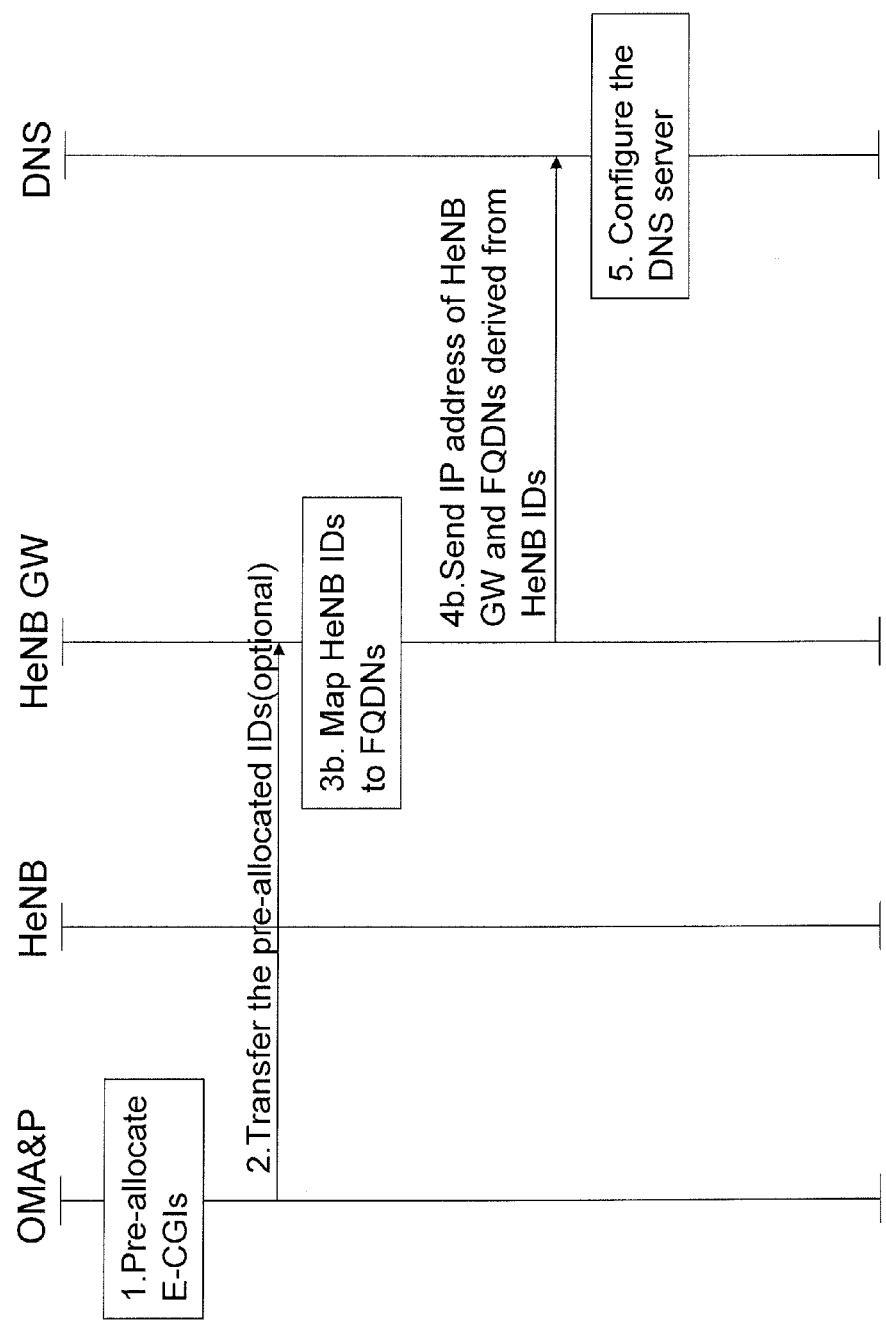

When the configuration of the DNS server is performed by the base station gateway as illustrated by FIGS. 3b and 4b, the method comprises the steps of:

1. Pre-allocating base station identities for the subsequently deployed second base stations to be connected to the base station gateway and optionally allocating a base station gateway identity at the Operation, Maintenance, Administration and Provisioning (OMA&P) node 309.

2. The OMA&P node 309 informs the base station gateway 306 about said base station gateway identity and/or said pre-allocated base station identities.

3. The gateway maps the base station identities to at least one FQDN or compact representation of range of FQDNs and 4. sends said at least one FQDN or compact representation of range of FQDNs together with at least one IP address of the base station gateway to a DNS server 311.

5. The DNS server 311 is configured with said at least one FQDN or compact representation of range of FQDNs and the at least one IP address such that an FQDN of a base station 302 of the subsequently deployed second base stations can be mapped (i.e. resolved) to an identity of the base station gateway 306 which the base station 302 will be connected to.

Figure 6:
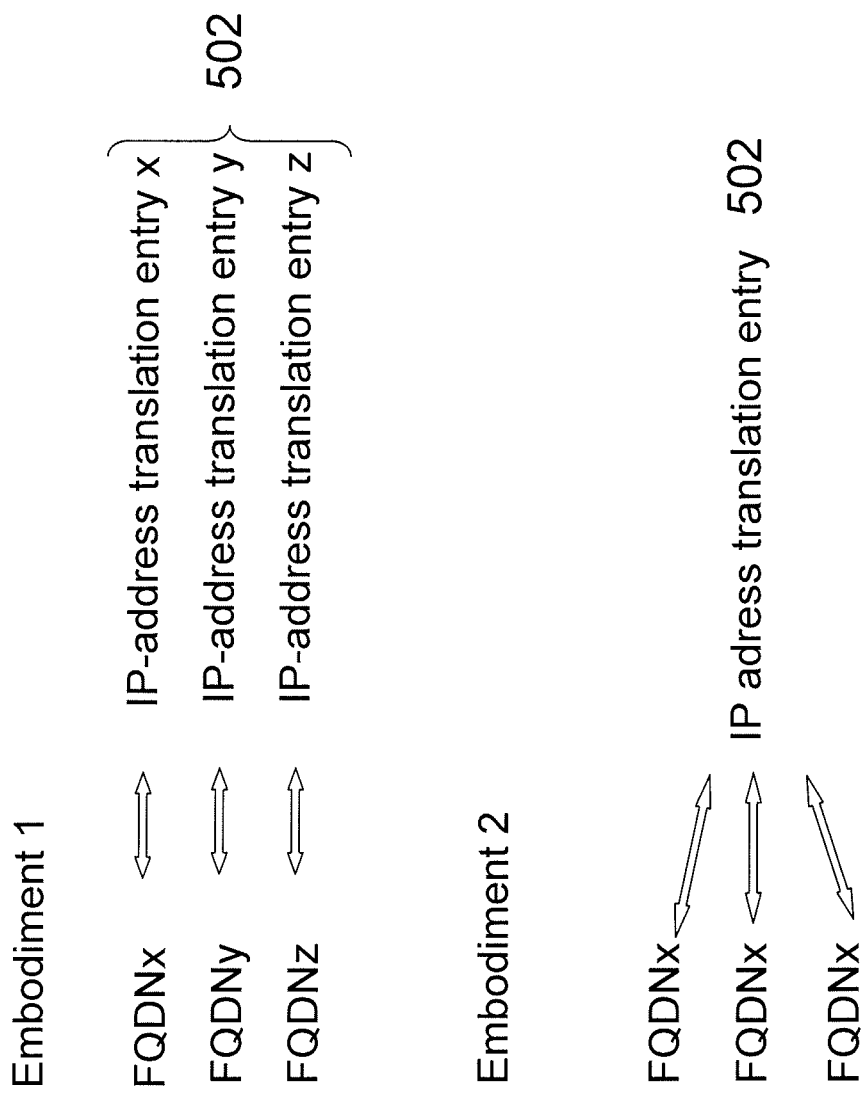

According to a first embodiment, a comprehensive DNS configuration is performed as illustrated in FIG. 6, where there is a one-to-one mapping between the FQDNs derived from the base station identities and the IP address translation database entries of the DNS server. As a part of the process of installing a HeNB GW the HeNB GW is allocated a range of E-CGIs and consequently a range of HeNB IDs, which will be allocated to the HeNBs that later connects to the HeNB GW and the femtocells that they serve. This E-CGI range is basically defined by the HeNB GW ID that the O&M system assigns to the HeNB GW, since the HeNB GW ID constitutes a part of the HeNB ID of each connected HeNB, which in turn is a part of the E-CGI of each cell that the HeNB serves.

As an example, arbitrarily assuming an 8-bit size HeNB GW ID, a 20-bit size HeNB ID and a 28 bits long E-CGI, if the assigned HeNB GW ID in binary form is 10010101 (=149 in decimal form) this would mean that the range of HeNB IDs allocated to the HeNB GW in binary form is 10010101000000000000-10010101111111111111 (i.e. 610304-614399 in decimal form) and the range of E-CGIs is 1001010100000000000000000000-1001010111111111111111111111 in binary form. An equivalent alternative would be to assign the HeNB GW ID as 10010101000000000000, i.e. the lowest HeNB ID in the range, or 1001010100000000000000000000, i.e. the lowest E-CGI in the range with an indication that the significant number of bits is 8. Yet an equivalent alternative would be to assign an arbitrary HeNB ID in the HeNB ID range, e.g. 10010101001100101101 or an arbitrary E-CGI in the E-CGI range, e.g. 1001010100110010110100111001, as the HeNB GW ID and allocate the E-CGI range, and hence HeNB ID range, separately.

During the HeNB GW installation procedure the O&M system, or alternatively the HeNB GW itself, contacts one or more DNS server(s) and configures FQDN-to-HeNB GW IP address translation data for FQDNs derived from the entire range of HeNB IDs allocated to the HeNB GW (i.e. 4096 FQDNs in the example above). A suitable FQDN format could be e.g. enb-id<HeNB ID>.eps.<operator-internal-domain> or henb-id<HeNB ID>.eps.<operator-internal-domain> or <HeNB ID>.enb-id.eps.<operator-internal-domain> or <HeNB ID>.henb-id.eps.<operator-internal-domain>. The <operator-internal-domain> part represents a domain name which is valid only within the operator-internal domain, i.e. inside the operator's network, and which can be resolved only by DNS servers inside the operator's domain (i.e. the domain name is unknown in the global DNS), e.g. "operator.home", "internal.operator" or "zone123.nwl.main". The <HeNB ID> part could be represented in e.g. one of the following ways, all of which use only the alphanumeric characters which are allowed in FQDNs:

Decimal: e.g. enb-id1466.eps.<operator-internal-domain> or 1466.enb-id.eps.<operator-internal-domain>

Decimal with separated digits: e.g. 1.4.6.6.enb-id.eps.<operator-internal-domain>

Decimal with separated digits in reversed order (in line with the basic FQDN principle to have the hierarchically highest symbol to the right): e.g. 6.6.4.1.enb-id.eps.<operator-internal-domain>

Hexadecimal: e.g. enb-id5BA.eps.<operator-internal-domain> or 5BA.enb-id.eps.<operator-internal-domain>

Hexadecimal with separated digits: e.g. 5.B.A.enb-id.eps.<operator-internal-domain>

Hexadecimal with separated digits in reversed order (in line with the basic FQDN principle to have the hierarchically highest symbol to the right): e.g. A.B.5.enb-id.eps.<operator-internal-domain>

Binary: e.g. enb-id10110111010.eps.<operator-internal-domain> or enb-id00000000010110111010.eps.<operator-internal-domain> (the purpose of the leading zeros would be to give the eNB ID a constant number of binary digits, e.g. 20 in this example, irrespective of its value)

Binary with separated digits: e.g. 1.0.1.1.0.1.1.1.0.1.0.enb-id.eps.<operator-internal-domain> or 0.0.0.0.0.0.0.0.0.1.0.1.1.0.1.1.1.0.1.0.enb-id.eps.<operator-internal-domain> (the purpose of the leading zeros would be to give the eNB ID a constant number of binary digits, e.g. 20 in this example, irrespective of its value)

Binary with separated digits in reversed order in line with the basic FQDN principle to have the hierarchically highest symbol to the right: e.g. 0.1.0.1.1.1.0.1.1.0.1.enb-id.eps.<operator-internal-domain> or 0.1.0.1.1.1.0.1.1.0.1.0.0.0.0.0.0.0.0.0.enb-id.eps.<operator-internal-domain>

If the HeNB GW ID is not part of the HeNB ID range allocated to it and even if it is part of the range, an FQDN-to-HeNB GW IP address translation entry/record for the FQDN derived from the HeNB GW ID may also be configured. The format of the FQDN derived from the HeNB GW ID could be e.g. henb-gw-id<HeNB GW ID>.eps.<operator-internal-domain> or henb-gw-id<HeNB GW ID>.eps.<operator-internal-domain> or <HeNB GW ID>.henb-gw-id.eps.<operator-internal-domain>, where the <HeNB GW ID> part could be represented in similar ways as described above for the <HeNB ID> part.

Subsequently, as HeNBs are connected to the HeNB GW, these HeNBs will be allocated HeNB IDs out of the allocated HeNB ID range (and E-CGIs out of the allocated E-CGI range) by the O&M system and gradually "populate" more and more of the allocated HeNB ID range.

When an eNBs detects a neighboring femtocell belonging to one of these HeNBs, it can use the regular procedure to extract the eNB ID of the HeNB (i.e. the HeNB ID) serving the detected femtocell from the E-CGI of the femtocell, derive an FQDN from the extracted HeNB ID and resolve it into the HeNB GW IP address via a DNS query. That is, the eNB can follow the regular procedure that it would follow when no HeNB GW is involved, e.g. when the detected neighbor cell is a macrocell.

In the first embodiment, a large number of FQDN-to-IP address translation entries/records have to be configured in the DNS server(s) as illustrated in FIG. 6. From a configuration effort point of view this is certainly acceptable, considering that it is a proactive one-time effort, but a "leaner" translation table is preferable in a DNS server from a performance point of view. According to a second embodiment, an aggregated DNS configuration is performed by introducing the concept of aggregated FQDN representation, or aggregated FQDN-to-IP address translation data configuration as also illustrated in FIG. 6. That implies that multiple FQDNs (each derived from a corresponding base station identity) match a single entry in the DNS server's FQDN-to-IP address (or, more accurately, FQDN-to-Resource Record) translation/resolution database, which in turn (provided that the translation/resolution entry includes an A or AAAA record) points out a single base station gateway IP address (or optionally a single list of IP addresses belonging to a base station gateway).

Instead of configuring FQDN-to-IP address translation entries/records for the FQDNs for all the HeNB IDs in the range one by one the properties of the data to be configured are utilized to achieve a more compact configuration:

The HeNB IDs from which the FQDNs are derived constitute a continuous value range.

All the FQDNs should be translated into the same IP address i.e. the IP address of the HeNB GW.

By introducing a description format that represents a range of FQDNs in a DNS entry/record the FQDNs of the full range of the HeNB IDs can be configured to translate into the HeNB GW IP address in a single DNS entry/record. Such a representation of a range of FQDNs is henceforth also denoted "aggregated FQDN". The format used to express an FQDN range as an aggregated FQDN depends partly on the format used for each individual FQDN in the range. Furthermore, the freedom in representation format is restricted by the fact that the HeNB GW ID is included in the most significant part of all the HeNB IDs in the HeNB ID range. This means that the HeNB ID range must represent the full binary range of the bits of the HeNB IDs that are not included in the HeNB GW ID. This means that for instance decimal range representations with wild card(s) cannot be used. The following are some examples of how the FQDN ranges could be represented (as aggregated FQDNs) (using decimal, hexadecimal or binary digits as in embodiment 1):

FQDN format: Decimal.
Range Indications:

-enb-id</decimalRange/:28672-32767>.eps.<operator-internal-domain> (i.e. matching the binary range 00000111000000000000-00000111111111111111 wherein the leading 8 digits (in bold) could constitute an 8-bit HeNB GW ID))
-</decimalRange/:28672-32767>.enb-id.eps.<operator-internal-domain>(i.e. matching the binary range 00000111000000000000-00000111111111111111 wherein the leading 8 digits (in bold) could constitute an 8-bit HeNB GW ID))

FQDN format: Decimal with separated digits.
Range Indications:

-</decimalRange/:2.8.6.7.2.-.3.2.7.6.7>.enb-id.eps.<operator-internal-domain> (i.e. matching the binary range 00000111000000000000-00000111111111111111 wherein the leading 8 digits (in bold) could constitute an 8-bit HeNB GW ID))

FQDN format: Decimal with separated digits in reversed order.
Range Indications:

-</decimalRange/:2.7.6.8.2.-.7.6.7.2.3>.enb-id.eps.<operator-internal-domain> (i.e. matching the binary range 00000111000000000000-00000111111111111111 wherein the leading 8 digits (in bold) could constitute an 8-bit HeNB GW ID))

FQDN format: Hexadecimal.
Range Indications:

-enb-id2B*.eps.<operator-internal-domain> (where * indicates arbitrary number of hexadecimal digits)
-2B*.enb-id.eps.<operator-internal-domain> (where * indicates arbitrary number of hexadecimal digits)
-enb-id</hexadecimalRange/Size=3/:2B*>.eps.<operator-internal-domain> (range: 2B000-2BFFF)
-</hexadecimalRange/Size=3/:2B*>.enb-id.eps.<operator-internal-domain> (range: 2B000-2BFFF)
-enb-id2B***.eps.<operator-internal-domain> (where * indicates a single hexadecimal digit) (range: 2B000-2BFFF)
-2B***.enb-id.eps.<operator-internal-domain> (where * indicates a single hexadecimal digit) (range: 2B000-2BFFF)
-enb-id<hexadecimalRange/:2B***>.eps.<operator-internal-domain> (range: 2B000-2BFFF)
-<hexadecimalRange/:2B***>.enb-id.eps.<operator-internal-domain> (range: 2B000-2BFFF)
-enb-id</hexadecimalRange/:2B000-2BFFF>.eps.<operator-internal-domain>
-</hexadecimalRange/:2B000-2BFFF>.enb-id.eps.<operator-internal-domain>

FQDN format: Hexadecimal with separated digits.
Range Indications:

-2.B.*.*.*.enb-id.eps.<operator-internal-domain> (where * indicates a single hexadecimal digit) (range: 2B000-2BFFF)
-enb-id</hexadecimalRange/:2.B.0.0.0.-.2.B.F.F.F>.eps.<operator-internal-domain> (range: 2B000-2BFFF)
-</hexadecimalRange/:2.B.0.0.0.-.2.B.F.F.F>.enb-id-eps.<operator-internal-domain> (range: 2B000-2BFFF)

FQDN format: Hexadecimal with separated digits in reversed order.
Range Indications:

```
-*.*.*.B.2.enb-id.eps.<operator-internal-domain> (where * indicates
a single hexadecimal digit) (range: 2B000-2BFFF)
-enb-id</hexadecimalRange/ :0.0.0.B.2.-.F.F.F.B.2>.eps.<operator-
internal-domain> (range: 2B000-2BFFF)
-</hexadecimalRange/ :0.0.0.B.2.-.F.F.F.B.2>.enb-id.eps.<operator-
internal-domain> (range: 2B000-2BFFF)
```

FQDN format: Binary.
Range Indications:

```
-enb-id11011010010001*.eps.<operator-internal-domain> (where *
indicates arbitrary number binary of digits)
-11011010010001*.enb-id.eps.<operator-internal-domain> (where *
indicates arbitrary number binary of digits)
-enb-id</binaryRange/ Size=12/ :10010001*>.eps.<operator-
internal-domain>(range: 10010001000000000000-
10010001111111111111) (The 8 leading digits could constitute an
8-bit HeNB GW ID.)
-</binaryRange/ Size=12/ :10010001*>.enb-id.eps.<operator-
internal-domain> (range: 10010001000000000000-
10010001111111111111) (The 8 leading digits could constitute an
8-bit HeNB GW ID.)
-enb-id10010001************.eps.<operator-internal-domain> (where
* indicates a single binary digit) (range: 10010001000000000000-
10010001111111111111)
-10010001************.enb-id.eps.<operator-internal-domain>
(where
* indicates a single binary digit) (range: 10010001000000000000-
10010001111111111111)
-enb-id</binaryRange/ :10010001************>.eps.<operator-
internal-domain> (range: 10010001000000000000-
10010001111111111111)
-</binaryRange/ :10010001************>.enb-id.eps.<operator-
internal-domain> (range: 10010001000000000000-
10010001111111111111)
-enb-id</binaryRange/ :10010001000000000000-
10010001111111111111>.eps.<operator-internal-domain>
-</binaryRange/ :10010001000000000000-
10010001111111111111>.enb-id.eps.<operator-internal-domain>
```

FQDN format: Binary with separated digits.
Range Indications:

```
-1.0.0.1.0.0.0.1.*.*.*.*.*.*.*.*.*.*.*.*.enb-id.eps.<operator-internal-
domain> (where * indicates a single binary digit) (range:
10010001000000000000-10010001111111111111)
-enb-id</binaryRange/:1.0.0.1.0.0.0.1.0.0.0.0.0.0.0.0.0.0.0.0.-
.1.0.0.1.0.0.0.1.1.1.1.1.1.1.1.1.1.1.1.1>.eps.<operator-internal-
domain> (range: 10010001000000000000-
10010001111111111111)
-</binaryRange/:1.0.0.1.0.0.0.1.0.0.0.0.0.0.0.0.0.0.0.0.-
.1.0.0.1.0.0.0.1.1.1.1.1.1.1.1.1.1.1.1.1>.enb-id.eps.<operator-
internal-domain> (range: 10010001000000000000-
10010001111111111111)
```

FQDN format: Binary with separated digits in reversed order.
Range Indications:

```
-*.*.*.*.*.*.*.*.*.*.*.*.1.0.0.0.1.0.0.1.enb-id.eps.<operator-internal-
domain> (where * indicates a single binary digit) (range:
10010001000000000000-10010001111111111111)
-enb-id</binaryRange/:0.0.0.0.0.0.0.0.0.0.0.0.1.0.0.0.1.0.0.1.-
.1.1.1.1.1.1.1.1.1.1.1.1. 1.0.0.0.1.0.0.1>.eps.<operator-internal-
domain> (range: 10010001000000000000-
10010001111111111111)
-</binaryRange/:0.0.0.0.0.0.0.0.0.0.0.0.1.0.0.0.1.0.0.1.-
.1.1.1.1.1.1.1.1.1.1.1.1.1.0.0.0.1.0.0.1>.enb-id.eps.<operator-
internal-domain> (range: 10010001000000000000-
10010001111111111111)
```

In the above described embodiments the FQDNs derived from the pre-allocated base station identities are mapped to one single aggregated FQDN. It should however be noted that this aggregated FQDN is not the FQDN which is included in the DNS query but only used in a DNS server's internal database. It is a compact way of representing multiple FQDNs in a DNS translation/resolution database, i.e. essentially merging multiple DNS translation/resolution database entries into one.

If the table in the DNS server includes overlapping ranges, or more likely hierarchical ranges, e.g. enb-id</binaryRange/:10010001**********>.eps.<operator-internal-domain> and enb-id</binaryRange/:1001000101******>.eps.<operator-internal-domain>, then the DNS server should use the longest-match principle when matching the FQDN in a received query (which in this context means the smallest matching range). For instance, in this example a query for the FQDN enb-id100100010100000000011.eps.<operator-internal-domain> would make the DNS server return the IP address (or other resource) associated with the table entry for the FQDN range enb-id</binaryRange/:1001000101********>.eps.<operator-internal-domain>.

If the HeNB GW ID is not part of the HeNB ID range allocated to it (and even if it is part of the range), a separate FQDN-to-HeNB GW IP address translation entry/record for the FQDN derived from the HeNB GW ID may also be configured.

Below, further extensions and variations to the above mentioned embodiments are described.

A HeNB GW may be configured with multiple IP addresses that can be used for the same purpose e.g. for X2 interfaces. The DNS server may then be configured to return a list of HeNB GW IP addresses in response to a query, i.e. a query for an FQDN derived from a HeNB ID belonging to the range of HeNB IDs allocated to the HeNB GW or a query for an FQDN derived from the HeNB GW ID or to select one of them to return e.g. in a round-robin fashion.

Further, the DNS server may be configured to return an FQDN derived from the HeNB GW ID in response to a query i.e. a query for an FQDN derived from a HeNB ID belonging to the range of HeNB IDs allocated to the HeNB GW. A querying eNB may extract the HeNB GW ID from the returned FQDN and may use this information to derive the range of E-CGIs that belong to the HeNB GW. Hence the eNB may use the HeNB GW ID for X2 selection, e.g. the eNB may determine whether an X2 interface to the HeNB GW can be utilized for a certain target femtocell. Together with the FQDN derived from the HeNB GW ID in the response the DNS server may also include one or more IP address(es) belonging to the HeNB GW (in order to avoid that a second DNS query is needed to resolve the FQDN derived from the HeNB GW ID into an IP address).

Inside the DNS server the translation process walks through several steps. In the above described embodiment 1, the FQDN derived from a HeNB ID is matched with the corresponding FQDN in the DNS server's table(s). This table entry/record includes the FQDN derived from the HeNB GW ID as its output. This FQDN is then used as input data in a second table search where the matching entry/record includes the HeNB GW IP address as its output. This process could be summarized "queried-HeNB-ID-FQDN"→"matching-HeNB-ID-FQDN"→"HeNB-GW-ID-FQDN"→HeNB GW IP address.

In the above mentioned embodiment 2, the process is similar. The only difference is that in the first step the FQDN derived from a HeNB ID is matched to a table entry/record representing an FQDN range (i.e. an aggregated FQDN) instead of a plain FQDN. That is, the corresponding summary for embodiment 2 becomes "queried-HeNB-ID-FQDN"→"matching-HeNB-ID-FQDN-range"→"HeNB-GW-ID-FQDN"→HeNB GW IP address.

The DNS server data that these translation processes are based on have to be configured by the O&M system, preferably in conjunction with the deployment/installation of the concerned HeNB GW. Alternatively the O&M system may configure the HeNB GW with the needed data when the HeNB GW is installed after which the HeNB GW in turn configures the DNS server accordingly.

The decision to return an FQDN derived from the HeNB GW ID in response to a query may be based on an indication in the query (e.g. a request for a CNAME resource record, i.e. the canonical name feature of DNS).

An FQDN derived from a HeNB GW ID should preferably have a format which is consistent with the format used for the FQDNs derived from the HeNB IDs, i.e. the format could be e.g. henb-gw-id<HeNB GWID>.eps.<operator-internal-domain> or <HeNB GW ID>.henb-gw-id.eps.<operator-internal-domain>, where the <HeNB GW ID> part could be represented according to any of the principles previously described for the <HeNB ID> part.

According to a further alternative, MME pool identification via DNS is possible. By utilizing the above described option to let the DNS server return an FQDN derived from the HeNB GW ID in response to a query including an FQDN derived from a HeNB ID the querying node, typically an eNB, may be informed of the MME pool that the HeNB GW and consequently all its connected HeNBs belong to as illustrated in step 806 of FIG. 8. Knowledge of which MME pool a target HeNB belongs to indicates to a querying eNB whether it should attempt to establish an X2 interface or not since the X2 interface is not used across MME pool borders. The easiest way to achieve this is to include an indication, preferably consisting of the MME Group Identity (MMEGI), in the FQDN derived from the HeNB GW ID. As a suitable example an FQDN carrying this information could have the format henb-gw-id<HeNB GW ID>.mmegi<MMEGI>.eps.<operator-internal-domain> or <HeNB GW ID>.henb-gw-id.mmegi<MMEGI>.eps.<operator-internal-domain> or <HeNB GW ID>.henb-gw-id.<MMEGI>.mmegi.eps.<operator-internal-domain>, where the <MMEGI> part could be represented according to any of the principles previously described for the <HeNB ID> part (e.g. using decimal, hexadecimal or binary digits, separated or non-separated digits or separated digits in reversed order).

If the FQDN that the DNS server returns is not intended to ever be used to resolve an IP address, then it may be a dummy FQDN, having basically any format as long as it complies with the general formatting rules for FQDNs and could consist of nothing more than an indication of the MMEGI e.g. simply mmegi<MMEGI> or only the <MMEGI> part.

With this feature a querying eNB can detect if the concerned HeNB i.e. the HeNB serving the newly detected neighbor femtocell belongs to another MME pool than the eNB and thus avoid attempting to establish the X2 interface.

According to a yet further alternative, femtocell E-CGI range indication may be performed via DNS. The DNS server could be configured to return to a querying eNB an FQDN that explicitly indicates the range of E-CGIs or HeNB IDs that is allocated to the concerned HeNB GW. Some examples of how the information could be formatted in an FQDN follow below:

- henb-gw-e-cgi-range30064771072-34359738367.eps.<operator-internal-domain> (corresponding to the binary range 0000011100000000000000000000-00000111111111111111111111111)
- 30064771072-34359738367.henb-gw-e-cgi-range.eps.<operator-internal-domain>
- 3.0.0.6.4.7.7.1.0.7.2.-.3.4.3.5.9.7.3.8.3.6.7.henb-gw-e-cgi-range.eps.<operator-internal-domain> (corresponding to the binary range 0000011100000000000000000000-00000111111111111111111111111)
- 7.6.3.8.3.7.9.5.3.4.3.-.2.7.0.1.7.7.4.6.0.0.3.henb-gw-e-cgi-range.eps.<operator-internal-domain> (corresponding to the binary range 0000011100000000000000000000-00000111111111111111111111111)
- henb-gw-e-cgi-range1B0000-1BFFFF.eps.<operator-internal-domain>
- 1B0000-1BFFFF.henb-gw-e-cgi-range.eps.<operator-internal-domain>
- 1.B.0.0.0.0.-.1.B.F.F.F.F.henb-gw-e-cgi-range.eps.<operator-internal-domain>
- F.F.F.F.B.1.-.0.0.0.0.B.1.henb-gw-e-cgi-range.eps.<operator-internal-domain>
- henb-gw-e-cgi-range1B.eps.<operator-internal-domain> (where "1B" indicates the leading hexadecimal digits of all E-CGIs in the range)
- 1B.henb-gw-e-cgi.eps.<operator-internal-domain> (where "1B" indicates the leading hexadecimal digits of all E-CGIs in the range)
- henb-gw-e-cgi-range10011101000000000000000000000-10011101111111111111111111111.eps.<operator-internal-domain>
- 10011101000000000000000000000-10011101111111111111111111111.henb-gw-e-cgi-range.eps.<operator-internal-domain>
- 1.0.0.1.1.1.0.1.0.0.0.0.0.0.0.0.0.0.0.0.0.0.0.0.0.0.0.0.0.-.1.0.0.1.1.1.0.1.1.1.1.1.1.1.1.1.1.1.1.1.1.1.1.1.1.1.1.1.1.henb-gw-e-cgi-range.eps.<operator-internal-domain>
- 1.1.1.1.1.1.1.1.1.1.1.1.1.1.1.1.1.1.1.1.1.0.1.1.1.0.0.1.-.0.0.0.0.0.0.0.0.0.0.0.0.0.0.0.0.0.0.0.0.0.1.0.1.1.1.0.0.1.henb-gw-e-cgi-range.eps.<operator-internal-domain>
- henb-gw-e-cgi-range10011101.eps.<operator-internal-domain> (where "10011101" indicates the leading binary digits of all E-CGIs in the range)
- 10011101.henb-gw-e-cgi.eps.<operator-internal-domain> (where "10011101" indicates the leading binary digits of all E-CGIs in the range)

If the HeNB GW ID is included as the most significant part of all E-CGIs that are allocated to it and if an FQDN derived from the HeNB GW ID is returned by the DNS server to a querying eNB, then this FQDN can implicitly indicate the E-CGI range to the eNB.

The eNB can use the knowledge about the E-CGI range when subsequent femtocells belonging to the same HeNB GW are detected as neighbors. The eNB can then determine that the E-CGI belongs to the known range and that the detected femtocell hence belongs to the HeNB GW that the E-CGI range is allocated to. From this the eNB can conclude that the X2 interface already established to this HeNB GW can be used also for this femtocell or, if no X2 interface has been established to the HeNB GW (because it belongs to another MME pool), that no X2 interface should be established and that handover signaling via MMEs and the S1 and S10 interfaces should be used for handovers to this femtocell.

According to a yet further alternative, HeNB GW ID elimination and "free" HeNB ID ranges is possible. Using HeNB ID ranges and/or E-CGI ranges it is possible to eliminate the need for a HeNB GW ID altogether. An eNB with an X2 interface towards the HeNB GW should preferably be able to derive from the E-CGI or the (H)eNB ID extracted from the E-CGI of a newly detected neighbor (femto)cell whether the X2 interface towards the HeNB GW can be used for handovers for this (femto)cell. This can be achieved by conveying the E-CGI range or HeNB ID range to the eNB as previously described, i.e. from the DNS server in a DNS response or from the HeNB GW during the X2 interface establishment procedure.

An MME to which the HeNB GW is connected would assumedly use the HeNB GW ID in an internal "S1 routing table" for mapping between HeNB ID (or HeNB GW ID) and S1 interface (using the longest-match principle) during handover signaling. However, also in this mechanism the HeNB GW ID may be replaced by a range, preferably the HeNB ID range allocated to the HeNB GW. By matching (H)eNB IDs with this HeNB ID range the correct S1 interface can be identified (i.e. the S1 interface towards the HeNB GW to which the concerned HeNB is connected). Thus, the HeNB ID range instead of the HeNB GW ID would be conveyed to the MME from the HeNB GW or the O&M system.

Eliminating the HeNB GW ID from the E-CGI enables more freedom in which HeNB ID ranges that can be allocated to a HeNB GW. This is because there is no longer a requirement that HeNB ID range should match a full binary range represented by the number of bits of the HeNB ID that are not included in the HeNB GW ID. Instead the range including its start and end values may be chosen freely within the entire full HeNB ID range i.e. the range of possible HeNB ID values. This allows for instance very convenient decimal representations of HeNB ID ranges in particular decimal range representations with wild card(s). The following are some examples of how such "free" ranges of FQDNs representing FQDNs derived from the HeNB IDs in the HeNB ID range could be represented in DNS entries/records in addition to the FQDN range representation examples provided above which of course still can be used:

FQDN format: Decimal.
Range Indications:

-enb-id12*.eps.<operator-internal-domain> (where * indicates arbitrary number decimal of digits)
-12*.enb-id.eps.<operator-internal-domain> (where * indicates arbitrary number decimal of digits)
-enb-id</decimalRange/Size=4/:12*>.eps.<operator-internal-domain> (range: 120000-129999)
-</decimalRange/Size=4/:12*>.enb-id.eps.<operator-internal-domain> (range: 120000-129999)
-enb-id12****.eps.<operator-internal-domain> (where * indicates a single decimal digit) (range: 120000-129999)
-12****.enb-id.eps.<operator-internal-domain> (where * indicates a single decimal digit) (range: 120000-129999)
-enb-id<decimalRange/:12****>.eps.<operator-internal-domain> (where * indicates a single decimal digit) (range: 120000-129999)
-<decimalRange/:12****>.enb-id.eps.<operator-internal-domain> (where * indicates a single decimal digit) (range: 120000-129999)
-enb-id</decimalRange/:120000-129999>.eps.<operator-internal-domain>
-</decimalRange/:120000-129999 >.enb-id.eps.<operator-internal-domain>

FQDN format: Decimal with separated digits.
Range Indications:

-1.2.*.*.*.*.enb-id.eps.<operator-internal-domain> (where * indicates a single decimal digit) (range: 120000-129999)
-<decimalRange/:1.2.*.*.*.*>.enb-id.eps.<operator-internal-domain> (where * indicates a single decimal digit) (range: 120000-129999)
-</decimalRange/:1.2.0.0.0.0.-.1.2.9.9.9.9>.enb-id.eps.<operator-internal-domain>

FQDN format: Decimal with separated digits in reversed order.
Range Indications:

-*.*.*.*.2.1.enb-id.eps.<operator-internal-domain> (where * indicates a single decimal digit) (range: 120000-129999)
-<decimalRange/*.*.*.*.2.1>.enb-id.eps.<operator-internal-domain> (where * indicates a single decimal digit) (range: 120000-129999)
-</decimalRange/:0.0.0.0.2.1.-.9.9.9.9.2.1>.enb-id.eps.<operator-internal-domain>

Similarly, "free" E-CGI ranges could be defined. The following are two examples of how such "free" E-CGI ranges could be represented in an FQDN returned by a DNS server as described above.

-henb-gw-e-cgi-range12.eps.<operator-internal-domain> (where "12" indicates the leading decimal digits of all E-CGIs in the range)
-12.henb-gw-e-cgi.eps.<operator-internal-domain> (where "12" indicates the leading decimal digits of all E-CGIs in the range)

The target system for the embodiments of the present invention is EPS/LTE, but the solutions could also be applied to 3G/UMTS/UTRAN, if dynamically established Iur interfaces towards HNB GWs will be used in the future.

As mentioned above a method in a DNS server for facilitating establishment of an interface between a first base station and a base station gateway in a mobile telecommunication network is provided. In the method as illustrated in FIGS. 3a-b and 4a-b, the DNS server receives 4a, 4b plain FQDNs or an aggregated FQDN derived from base station identities pre-allocated to the subsequently deployed second base stations together with at least one IP address of a base station gateway to which the subsequently deployed second base stations will be connected and the DNS server is configured 5 with said plain FQDNs or aggregated FQDN and the at least one IP address such that an FQDN of a subsequently deployed second base station can be mapped to an identity of the base station gateway which the second base station will be connected to.

Figure 8:
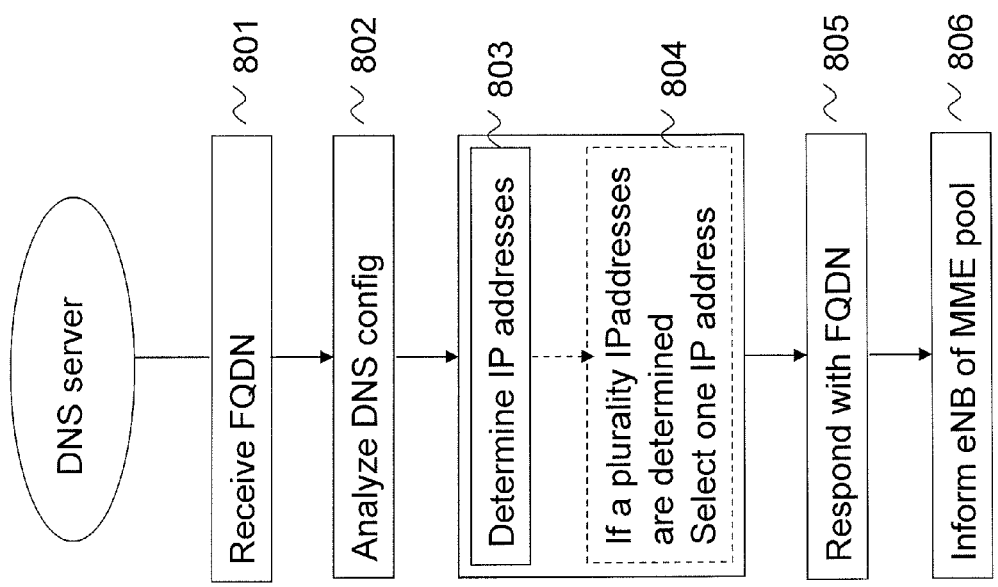
FIG. 8 is a flowchart of the method in a DNS server according to embodiments of the present invention.

As illustrated in FIG. 8, the DNS server may receive 801 an FQDN associated with a base station identity associated with a second base station for DNS lookup from the first base station. Moreover, the DNS server analyzes 802 the DNS configuration, and responds 805 to the first base station with at least one IP address of the base station gateway to which the second base station is connected. If a plurality of IP addresses are determined 803 one IP address is selected 804 or the plurality of IP addresses are included in the response to the first base station.

As an alternative, the DNS server may respond 805 to the first base station with an FQDN derived from the identity of the base station gateway.

Figure 5:
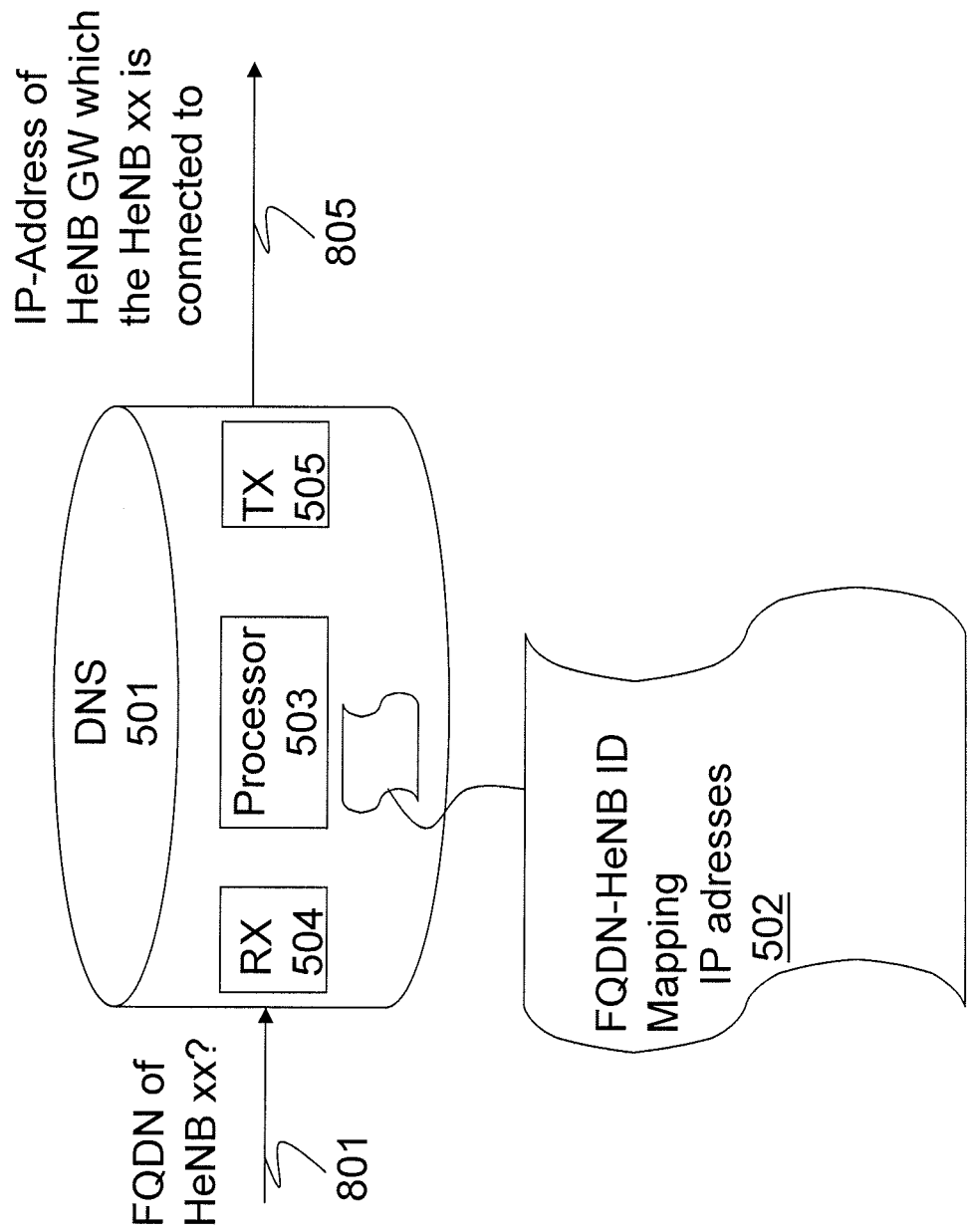
FIGS. 5-7 illustrate arrangements according to embodiments of the present invention.

Hence the DNS server according to embodiments of the present invention comprises as illustrated in FIG. 5, a receiver 504 for receiving an FQDN of a base station, e.g. a home base station, a processor for mapping the FQDNs to IP addresses and a memory for storing said mapping 502 and associated IP addresses. The DNS server 501 further comprises a transmitter 505 for sending the resolved IP address of the base station gateway.

Figure 7:
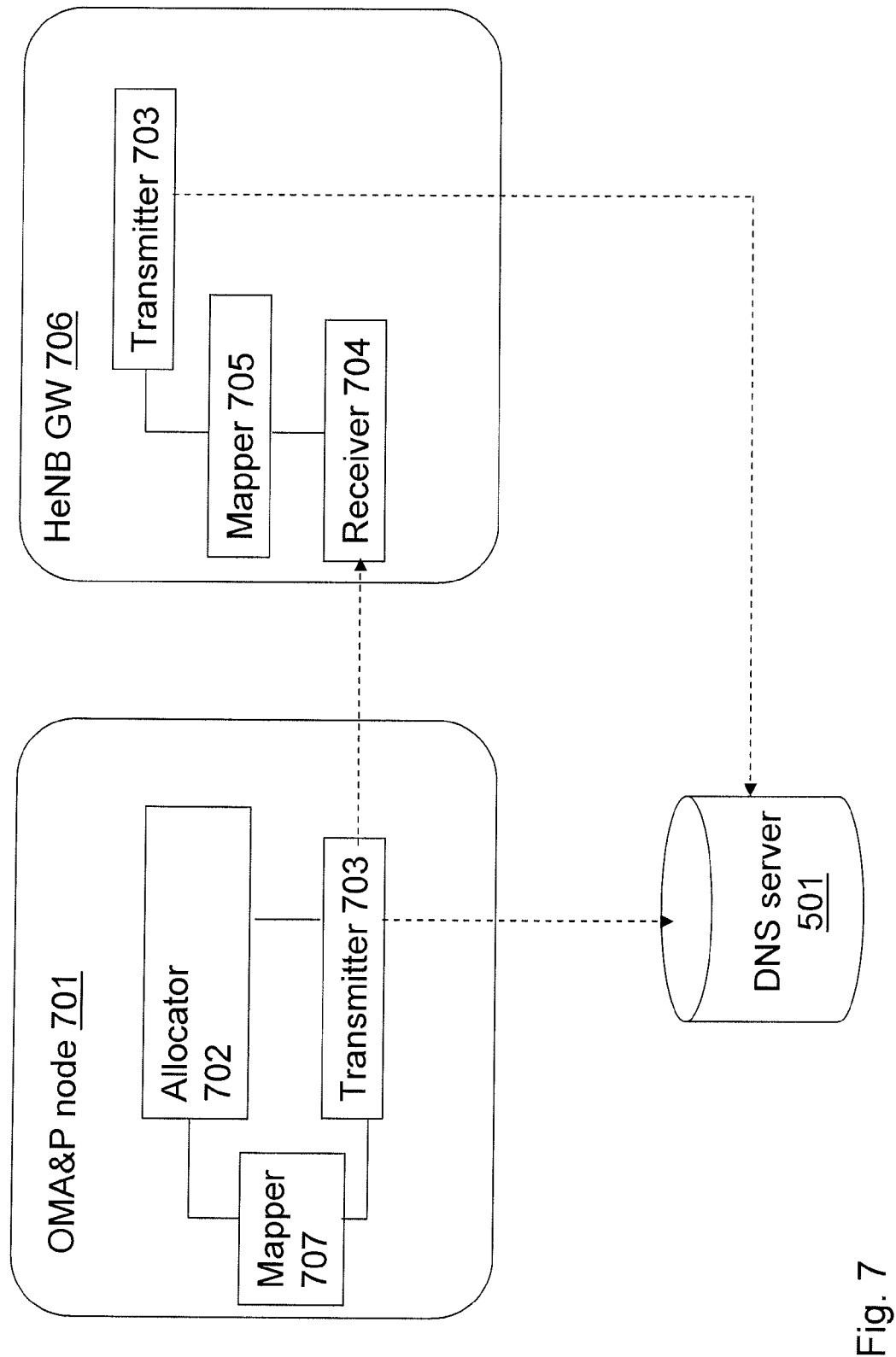

Moreover, the network node 701, e.g. an OMA&P node for facilitating establishment of an interface between a first base station and a base station gateway in a mobile telecommunication network, wherein subsequently deployed second base stations will have a connection to the core network and to the first base stations of the mobile telecommunication network via the base station gateway 706, is provided as illustrated in FIG. 7. The network node 701 comprises an allocator (702) for pre-allocating base station identities for the subsequently deployed second base stations to be connected to the base station gateway and optionally for allocating a base station gateway identity, and a transmitter (703) for optionally informing the base station gateway about said pre-allocated base station identities and/or said allocated base station gateway identity, wherein the identities are configured to be subsequently mapped to one FQDN each for DNS look up at a DNS server such that base station gateways can be identified to which subsequent deployed second base stations will be connected to. According to one embodiment, the node 701 further comprises a mapper 707 for mapping base station identities (e.g. HeNB identities) to plain FQDNs or to an aggregated FQDN. In this embodiment, the transmitter 703 is further configured to send a DNS configuration to a DNS server comprising an IP address of the base station gateway and the plain FQDNs or aggregated FQDN derived from the HeNB identities.

A base station gateway 706 which may be a home base station gateway is also illustrated in FIG. 7. The base station gateway comprises a receiver 704 for receiving pre-allocated base station identities for subsequently deployed second base stations to be connected to the base station gateway and/or a base station gateway identity, a mapper 705 for mapping the base station identities to one plain FQDN each or to an aggregated FQDN. The base station gateway may further comprise a transmitter 703 for sending said plain FQDNs or aggregated FQDN together with at least one IP address of the base station gateway, to which the second base stations will be connected, to a DNS server 501 such that the DNS server can be configured with said FQDNs or aggregated FQDN and the at least one IP address for mapping a FQDN of the second base station to the IP address of the base station gateway to which the second base station will be connected.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for facilitating establishment of a traffic interface between a first base station and a base station gateway in a mobile telecommunication network, wherein subsequently deployed second base stations will have a connection to a core network and to the first base station of the mobile telecommunication network via the base station gateway, the method comprising:
   pre-allocating base station identities for the subsequently deployed second base stations to be connected to the base station gateway;
   mapping the pre-allocated base station identities to at least one Fully Qualified Domain Name (FQDN), wherein the mapping of the pre-allocated base station identities comprises mapping the pre-allocated base station identities to one plain FQDN;
   sending the at least one FQDN together with at least one IP address of the base station gateway to a Domain Name System (DNS) server; and
   configuring the DNS server with the at least one FQDN and the at least one IP address such that an FQDN of a base station of the subsequently deployed second base stations can be mapped to an identity of the base station gateway which the base station of the subsequently deployed second base stations will be connected to, to facilitate the establishment of the traffic interface between the first base station and the base station gateway.

2. The method according to claim 1, further comprising selecting, by an Operation, Maintenance, Administration, and Provisioning (OMA&P) node the pre-allocated base station identities.

3. The method according to claim 1, further comprising using the pre-allocated base station identities for identifying subsequently deployed second base stations to be connected to the base station gateway.

4. The method according to claim 1, wherein the first base station comprises a macro base station and the second base stations comprise home base stations.

5. The method according to claim 2, wherein the pre-allocating of the base station identities comprises pre-allocating the base station identities selected by the OMA&P node by the base station gateway.

6. The method according to claim 2, wherein the pre-allocating of the base station identities comprises pre-allocating the base station identities selected by the OMA&P node at the OMA&P node.

7. The method according to claim 5, further comprising informing the base station gateway about the pre-allocated base station identities.

8. A method in a network node for facilitating establishment of a traffic interface between a first base station and a base station gateway in a mobile telecommunication network, wherein subsequently deployed second base stations will have a connection to a core network and to the first base station of the mobile telecommunication network via the base station gateway, the method comprising:
   pre-allocating base station identities for the subsequently deployed second base stations to be connected to the base station gateway;
   wherein the pre-allocated base station identities are configured to be subsequently mapped to at least one Fully Qualified Domain Name (FQDN) for Domain Name System (DNS) lookup at a DNS server such that the base station gateway to which subsequent deployed second base stations will be connected to can be identified to facilitate the establishment of the traffic interface between the first base station and the base station gateway; and
   mapping of the pre-allocated base station identities to one plain FQDN.

9. The method according to claim 8, further comprising:
   sending the at least one FQDN together with at least one Internet Protocol (IP) address of the base station gateway to the DNS server.

10. The method according to claim 8, further comprising using the pre-allocated base station identities for identifying the subsequently deployed second base stations to be connected to the base station gateway.

11. The method according to claim 8, wherein the network node comprises an Operation, Maintenance, Administration, and Provisioning (OMA&P) node.

12. A method in a base station gateway for facilitating establishment of a traffic interface between a first base station and the base station gateway in a mobile telecommunication network, wherein subsequently deployed second base stations will have a connection to a core network and to the first base station of the mobile telecommunication network via the base station gateway, the method comprising:
   receiving pre-allocated base station identities for subsequently deployed second base stations to be connected to the base station gateway, wherein the pre-allocated base station identities are configured to be subsequently mapped to at least one Fully Qualified Domain Name (FQDN) for Domain Name System (DNS) look up at a DNS server such that the base station gateway to which subsequent deployed second base stations will be connected to can be identified to facilitate the establishment of the traffic interface between the first base station and the base station gateway; and mapping the pre-allocated base station identities to one plain FQDN.

13. The method according to claim 12, further comprising: sending the at least one FQDN together with at least one Internet Protocol (IP) address of the base station gateway to the DNS server such that the DNS server can be configured with the at least one FQDN together with at least one IP address of the base station gateway for mapping the one plain FQDN of the second base station to the IP address of the base station gateway to which the second base station will be connected to.

14. The method according to claim 12, further comprising using the pre-allocated base station identities for identifying the subsequently deployed second base stations to be connected to the base station gateway.

15. A method in a Domain Name System (DNS) server for facilitating establishment of a traffic interface between a first base station and a base station gateway in a mobile telecommunication network, wherein subsequently deployed second base stations will have a connection to a core network and to the first base station of the mobile telecommunication network via the base station gateway, the method comprising:

receiving at least one Fully Qualified Domain Name (FQDN), associated with pre-allocated base station identities for the subsequently deployed second base stations to be connected to the base station gateway, together with at least one Internet Protocol (IP) address of the base station gateway to which the subsequently deployed second base stations will be connected; and configuring the DNS server with the at least one FQDN together with the at least one IP address of the base station gateway such that one plain FQDN of one subsequently deployed second base station can be mapped to an identity of the base station gateway which the one second base station will be connected to, to facilitate the establishment of the traffic interface between the first base station and the base station gateway.

16. The method according to claim 15, further comprising: receiving the FQDN associated with the base station identity associated with one of the second base stations in a DNS query from the first base station;
analyzing the DNS configuration; and
responding, based on the DNS configuration, to the first base station with at least one IP address of the base station gateway to which the second base station of the DNS query is connected.

17. The method according to claim 15, further comprising: receiving the FQDN associated with the base station identity associated with one of the second base stations for DNS lookup from a first base station;
analyzing the DNS configuration;
determining, based on the DNS configuration, a plurality of IP addresses of the base station gateway to which the second base station for DNS lookup is connected;
selecting one of the determined IP addresses; and
responding to the first base station with the selected IP address of the base station gateway, or responding to the first base station with the determined plurality of IP addresses.

18. The method according to claim 15, further comprising: using the pre-allocated base station identities for identifying the second base stations to be connected to the base station gateway;
receiving the FQDN associated with the pre-allocated base station identity associated with one of the second base stations for DNS lookup from a first base station;
analyzing the DNS configuration; and
responding to the first base station with the FQDN derived from the identity of the base station gateway.

19. The method according to claim 18, wherein the FQDN derived from the identity of the base station gateway includes an identity of a Mobility Management Entity (MME) pool to which the base station gateway is connected.

20. A network node for facilitating establishment of a traffic interface between a first base station and a base station gateway in a mobile telecommunication network, wherein subsequently deployed second base stations will have a connection to a core network and to the first base station of the mobile telecommunication network via the base station gateway, the network node comprising:

an allocator configured to pre-allocate base station identities for the subsequently deployed second base stations to be connected to the base station gateway;

wherein the pre-allocated base station identities are configured to be subsequently mapped to at least one Fully Qualified Domain Name (FQDN) for Domain Name System (DNS) lookup at a DNS server such that the base station gateway to which subsequently deployed second base stations will be connected to can be identified to facilitate the establishment of the traffic interface between the first base station and the base station gateway; and a mapper configured to map the pre-allocated base station identities to one plain FQDN.

21. The network node according to claim 20, further comprising:
a transmitter for sending the at least one FQDN together with at least one Internet Protocol (IP) address of the base station gateway to the DNS server.

22. The network node according to claim 20, wherein the pre-allocated base station identities are to be used for identifying the subsequently deployed second base stations to be connected to the base station gateway.

23. The network node according to claim 20, wherein the network node comprises an operation, maintenance, administration, and provisioning node.

24. A base station gateway for facilitating establishment of a traffic interface between a first base station and the base station gateway in a mobile telecommunication network, wherein subsequently deployed second base stations will have a connection to a core network and to the first base station of the mobile telecommunication network via the base station gateway, the base station gateway comprising a receiver for receiving pre-allocated base station identities for subsequently deployed second base stations to be connected to the base station gateway; and a mapper configured to map the pre-allocated base station identities to at least one Fully Qualified Domain Name (FQDN) for Domain Name System (DNS) look up at a DNS server such that the base station gateway to which subsequent deployed second base stations will be connected to can be identified to facilitate the establishment of the traffic interface between the first base station and the base station gateway, wherein the mapper is configured to map the pre-allocated base station identities to one plain FQDN.

25. The base station gateway according to claim 24, further comprising a transmitter for sending the at least one FQDN together with at least one Internet Protocol (IP) address of the base station gateway to the DNS server such that the DNS server can be configured with the at least one FQDN together with the at least one IP address of the base station gateway for mapping a FQDN of the subsequently deployed second base stations to the at least one IP address of the base station gateway to which the subsequently deployed second base stations will be connected.

26. A Domain Name System (DNS) server for facilitating establishment of a traffic interface between a first base station and a base station gateway in a mobile telecommunication network, wherein subsequently deployed second base stations will have a connection to a core network and to the first base station of the mobile telecommunication network via the base station gateway, the DNS server comprising:
- a receiver for receiving at least one Fully Qualified Domain Name (FQDN), associated with pre-allocated base station identities for the subsequently deployed second base stations to be connected to the base station gateway, together with at least one Internet Protocol (IP) address of the base station gateway to which the subsequently deployed second base stations will be connected; and
- a processor configured to configure the DNS server with the at least one FQDN together with the at least one IP address of the base station gateway such that one plain FQDN of a subsequently deployed second base station can be mapped to an identity of the base station gateway to which the second base station will be connected to facilitate the establishment of the traffic interface between the first base station and the base station gateway.

27. The DNS server according to claim 26:
- wherein the receiver is further configured to receive the FQDN associated with the pre-allocated base station identity associated with one of the second base stations in a DNS query from the first base station;
- wherein the processor is further configured to analyze the DNS configuration;
- wherein the DNS server further comprises a transmitter configured to respond, based on the DNS configuration, to the first base station with at least one IP address of the base station gateway to which the second base station of the DNS query is connected.

28. The DNS server according to claim 26:
- wherein the receiver is further configured to receive the FQDN associated with the pre-allocated base station identity associated with one of the second base stations for DNS lookup from a first base station;
- wherein the processor is further configured to analyze the DNS configuration, to determine, based on the DNS configuration, a plurality of IP addresses of the base station gateway to which the second base station of the DNS lookup is connected, and to select one of the determined IP addresses:
- wherein the DNS server further comprises a transmitter configured to respond to the first base station with the selected IP address of the base station gateway, or to respond to the first base station with the plurality of IP addresses.

29. The DNS server according to claim 26:
- wherein the pre-allocated base station identities are to be used for identifying the second base stations to be subsequently connected to the base station gateway;
- wherein the receiver is further configured to receive the FQDN associated with the pre-allocated base station identity associated with one of the second base stations for DNS lookup from a first base station;
- wherein the processor is further configured to analyze the DNS configuration;
- wherein the DNS server further comprises a transmitter configured to respond to the first base station with an FQDN derived from the identity of the base station gateway.

* * * * *

UNITED STATES PATENT AND TRADEMARK OFFICE
CERTIFICATE OF CORRECTION

PATENT NO. : 8,879,486 B2  
APPLICATION NO. : 13/377097  
DATED : November 4, 2014  
INVENTOR(S) : Nylander et al.

Page 1 of 1

It is certified that error appears in the above-identified patent and that said Letters Patent is hereby corrected as shown below:

IN THE SPECIFICATION

In Column 2, Line 7, delete "the 51" and insert -- the S1 --, therefor.

In Column 2, Line 9, delete "the 51" and insert -- the S1 --, therefor.

Signed and Sealed this  
Twelfth Day of January, 2016

Michelle K. Lee  
*Director of the United States Patent and Trademark Office*